May 6, 1941.  L. G. DANIELS  2,241,121
APPARATUS FOR TESTING WATER
Filed July 23, 1938  8 Sheets-Sheet 1

Fig. 1

Inventor:
Lee G. Daniels
By
McCanna, Wintercorn & Morsbach
Attys.

May 6, 1941.  L. G. DANIELS  2,241,121
APPARATUS FOR TESTING WATER
Filed July 23, 1938  8 Sheets-Sheet 2

May 6, 1941.  L. G. DANIELS  2,241,121
APPARATUS FOR TESTING WATER
Filed July 23, 1938   8 Sheets-Sheet 5

Inventor:
Lee G. Daniels
By McAnna, Wintercorn & Morshach
Attys.

May 6, 1941. L. G. DANIELS 2,241,121
APPARATUS FOR TESTING WATER
Filed July 23, 1938  8 Sheets-Sheet 6

Patented May 6, 1941

2,241,121

UNITED STATES PATENT OFFICE 2,241,121

APPARATUS FOR TESTING WATER

Lee G. Daniels, Rockford, Ill., assignor to Elgin Softener Corporation, Elgin, Ill., a corporation of Illinois Application July 23, 1938, Serial No. 220,906

8 Claims. (Cl. 23—253)

This invention relates to testing devices and more particularly to a device for testing for a predetermined amount of either hardness or softness in the water, and for emitting a signal of some kind, such as a visual or audible signal, or for initiating the cycle of operation of any well known type of water softener, for example, by closing the switch or switches thereof which are normally closed manually. The device also finds use in the proportioning of water and has other uses which are apparent to those skilled in the art.

An object of the invention is the provision of a generally improved device of the character described.

I have also aimed to provide a tester wherein improved means are provided for indicating the presence of hardness in the water and for responding to the absence thereof.

Another object of the invention is the provision of a tester having improved means for selecting a test portion, for adding a soap solution thereto, for producing agitation therein to develop a foam, and for indicating the presence or absence of a predetermined amount of test foam or suds on the test sample.

Another object of the invention is the provision of a tester wherein the presence or absence of a certain amount of hardness in the water is indicated by the presence or absence of a certain amount of foam or suds on a test portion, and the provision therein of improved means for responding to the presence or absence of a certain amount of foam.

A still further object of the invention is the provision of an improved method for testing water for hardness or the absence of hardness, which includes the step of seating a light float on the top of the foam for the purpose of obtaining the desired test result.

Other objects and advantages will appear from the following description and the accompanying drawings, in which—

The invention contemplates a testing device adapted to be connected to a water supply and to conduct tests on the water or other liquid in succession, and adapted to perform some operation such as the closing of the circuit for controlling or operating some other device such as a signal, a bell, a motor or the like in response either to a negative or a positive test for hardness. In the present embodiment of the invention, a test chamber is provided having drain, overflow, inlet valves and a test bell in the form of an inverted cup or float. At the beginning of the cycle of the test the drain is closed, the overflow is closed, the inlet is closed, and the float is down resting against the surface of the material in the chamber. During the first operating interval, the drain is opened, the overflow is opened and the inlet is opened. During the next operating interval time is allowed to lapse during which period liquid flows through the chamber for the purpose of flushing the same. In the next operating interval the drain is closed so that liquid flows into the chamber filling the same and overflowing through the overflow for a short interval for washing out and cleaning the chamber. Thereafter the inlet is closed and the liquid is allowed to pass out through the overflow to the level of the overflow, thus retaining a measured amount of liquid in the chamber. The overflow is thereupon closed and a measured quantity of soap is injected into the chamber. This mixture of soap and liquid is then agitated and aerated for the purpose of producing a froth or suds. Thereafter a short period of time is allowed to elapse to give time for the foam to subside. With hard water a temporary foam may be produced by the violent agitation, and by permitting this dwell the froth will break and disappear. With soft water the froth will remain as what is known as a permanent foam. Thereafter the float is set down thereon. If the water was soft, the froth will support the float in an elevated position, but if no froth or suds, or only a small amount is present the float will move to a lower position. A time dwell is allowed in order to permit the float to come to rest. After this dwell a circuit is established between the float and the signal or other mechanism. Means are provided such as to cause this circuit to be closed when the float drops to a lower position corresponding to more than a predetermined hardness in the water, and so that the circuit will be open if the float is supported at an elevated position by the foam, so as to give the signal or perform other functions in response to the position of the float, in this instance testing, in effect for the presence or appearance of hardness. Means are also provided for causing the reversal of operation, that is, causing the circuit to be closed when the float occupies the upper position and open at its lower position so as to perform a test for softness as distinguished from a test for hardness in the water.

Figure 1:
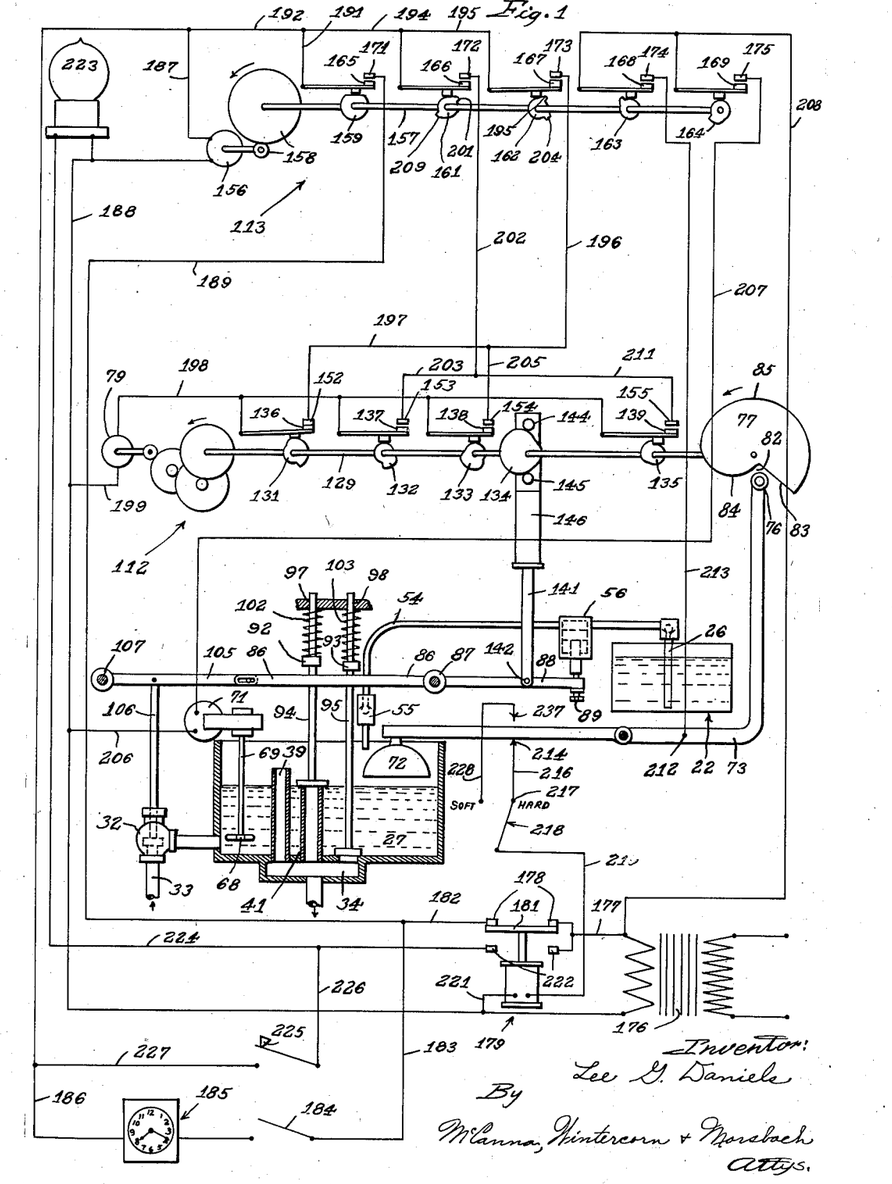
Figure 1 is a diagrammatic showing of a tester embodying my invention.
Figure 3:
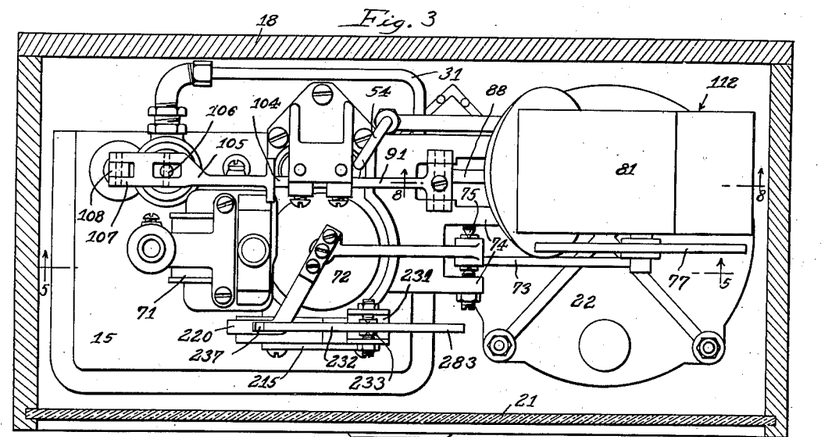
Fig. 3 is a top view of a preferred embodiment of the invention.
Figure 4:
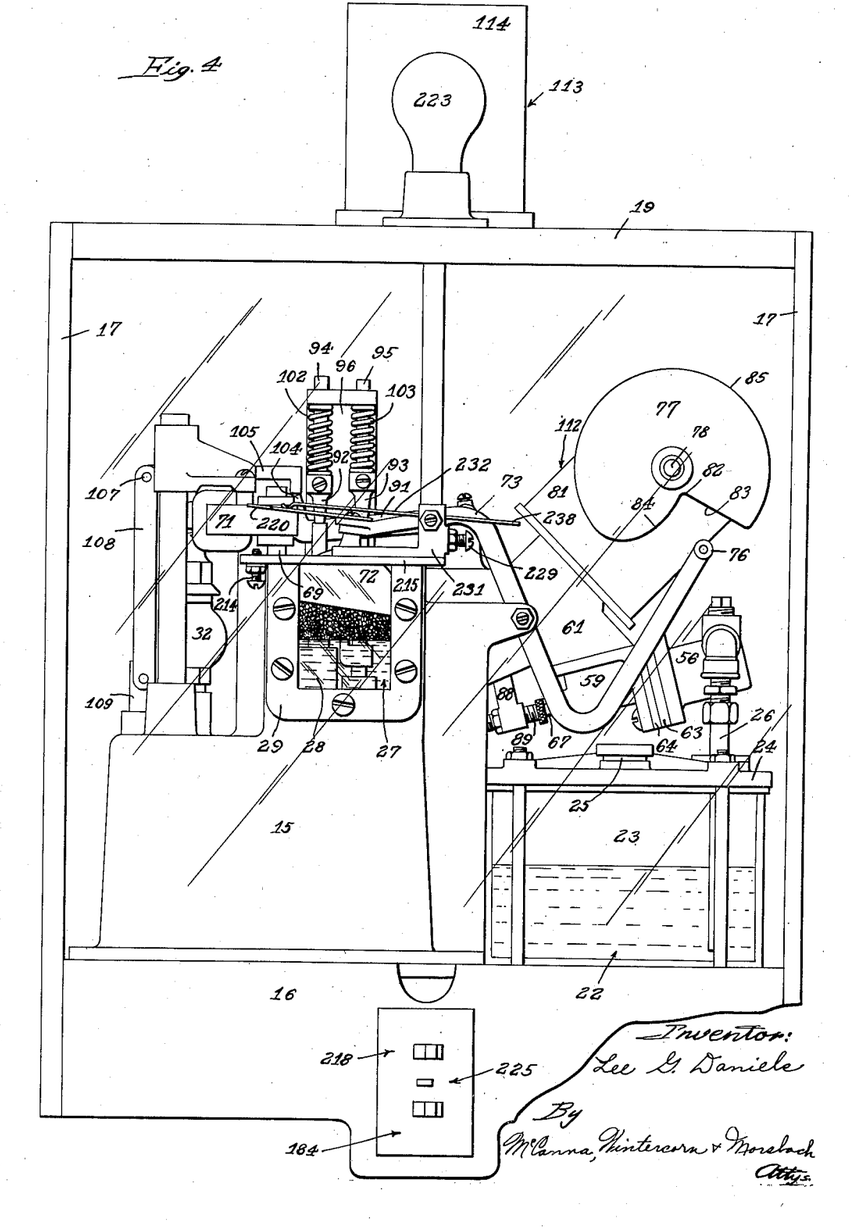
Fig. 4 is a front view thereof.
Figure 5:
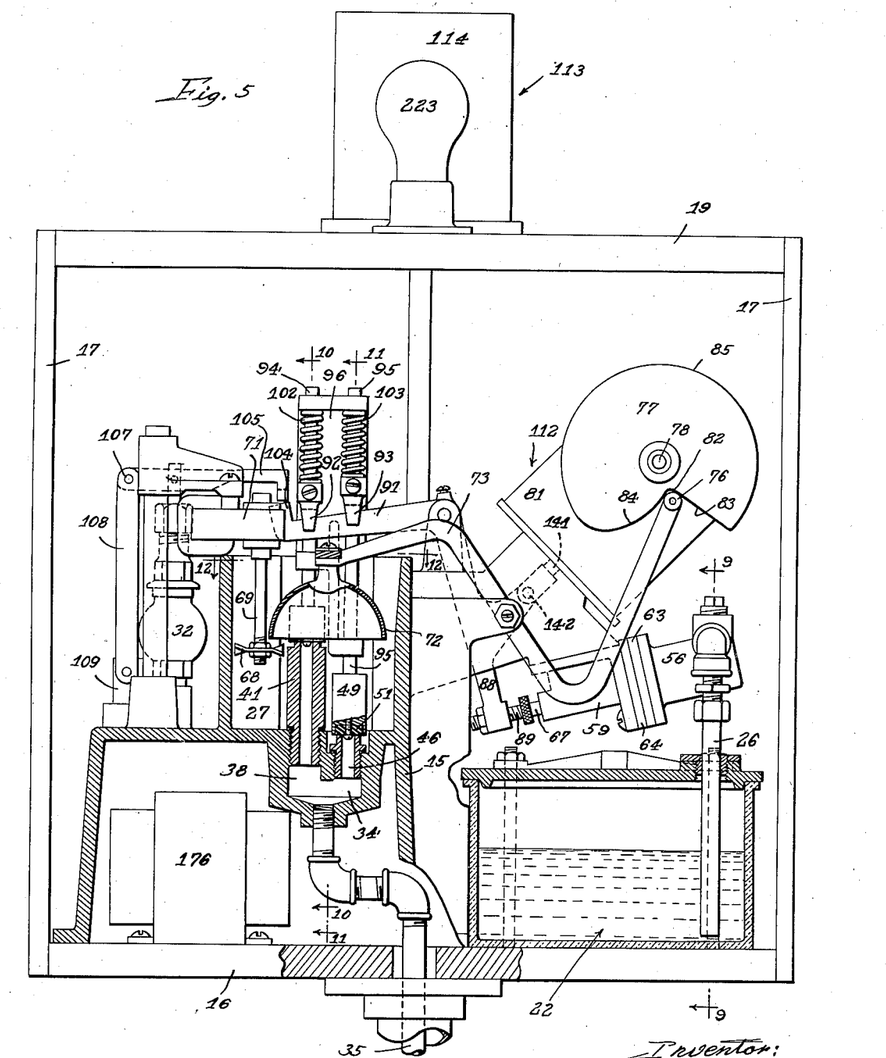
Fig. 5 is a section on the line 5—5 of Fig. 3.
Figure 6:
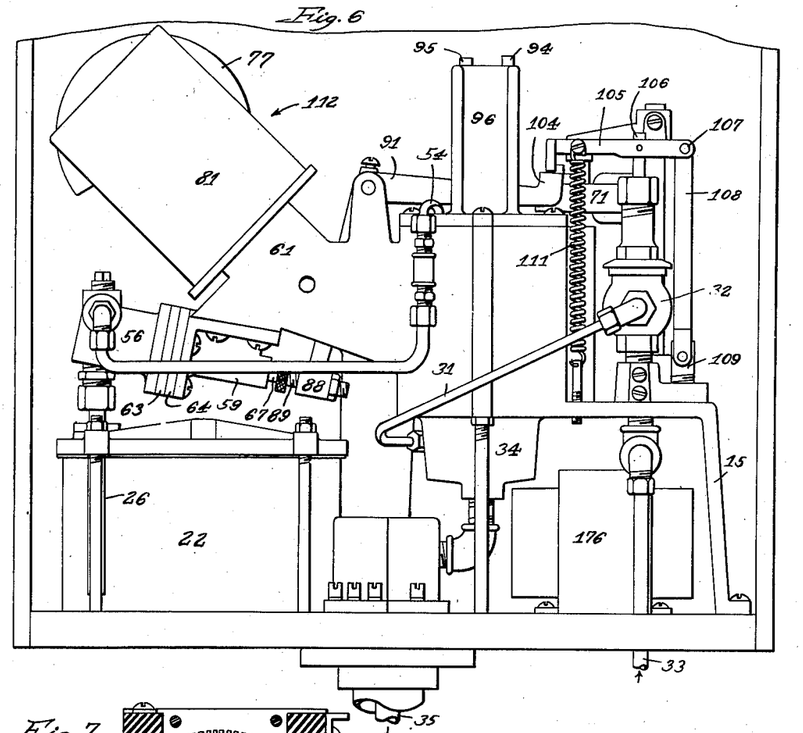
Fig. 6 is a rear view thereof.
Figure 7:
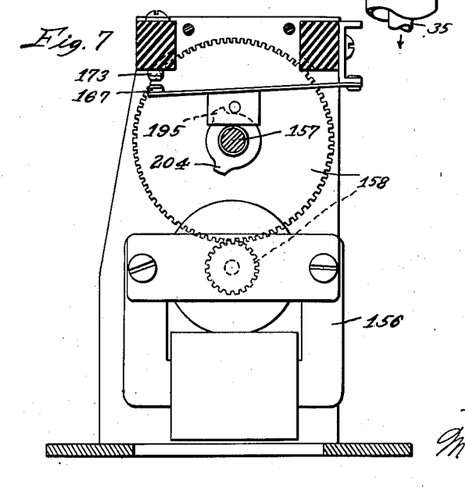
Fig. 7 is a vertical section through the timing motor with the cover removed therefrom.

Referring to Figs. 1, 3 and 4, particularly, the present embodiment of the invention includes a frame designated generally by the numeral 15 and adapted to support and carry a major part of the operative mechanism. In this instance the frame 15 is seated on a base 16. The base 16 has side walls 17, a back 18, and a top 19 providing an enclosure for a major part of the operating mechanism, the front of the case formed by the base and walls being closed by a window 21 of glass, permitting inspection of the mechanism. Positioned on the base 16 is a tank 22, in this instance adapted to hold soap solution though suitable for other reagents which may be desirable in conducting the tests. This tank has in this instance glass side walls 23 and a top 24 provided with a capped opening 25 for filling the same and a tube 26 extending to a point adjacent the bottom of the tank for the purpose of delivering the soap solution therefrom, as will presently more fully appear. A test chamber designated generally by the numeral 27 is in this instance formed in the top of the frame 15 and has a glass front panel 28 secured in position by means of a retainer and screws 29. Water or other liquid to be tested is conducted to the chamber 27 through a pipe 31, a valve 32 and an inlet pipe 33 (Figs. 5 and 6). The lower end of the chamber 27 has a manifold well 34 connected to drain through a pipe 35 and communicating with the chamber 27 by means of internally threaded bores 36, 37 and 38. Threaded into the bore 37 is a safety overflow tube 39 which extends upwardly into the chamber and is designed to at all times permit overflow when the level of the liquid in the chamber 27 reaches an excessive height and thereby limit the upper level of liquid in the chamber. A second overflow is provided by a tube 41 threaded into the bore 38 as shown at 42 and having an upper end 43 of reduced external diameter, the upper end of the overflow 41 being lower than the upper end of the overflow 39, the overflow 41 serving to determine the amount of the sample and to cause a measured quantity of the liquid to be retained in the chamber. A closure 44 is provided for the upper end of the overflow 41 and has a rubber seat 45 seating against the upper end of the overflow tube to seal the same. The closure 44 is actuated in timed relation with the remainder of the mechanism by means presently to be described. A thimble 46 is threaded into the bore 36 and has a shoulder 47 and gasket 48 for sealing the junction therebetween. The upper end of the thimble is positioned on a level slightly below the lower surface of the chamber 27 and serves as a drain for the chamber. A closure 49 having a resilient seat 51 functions to close the upper end of the drain port in timed relationship with the operation of the mechanism as will presently be described.

In the operation of the device water passes to the chamber through the pipe 31 and passes upward through the bottom of the chamber and is discharged into the chamber through a nozzle 52 having an orifice 53 disposed sidewise so as to give the entering water a swirl around the chamber and thus pick up any sediment or precipitate which may be present therein to flush the same from the chamber.

Figure 8:
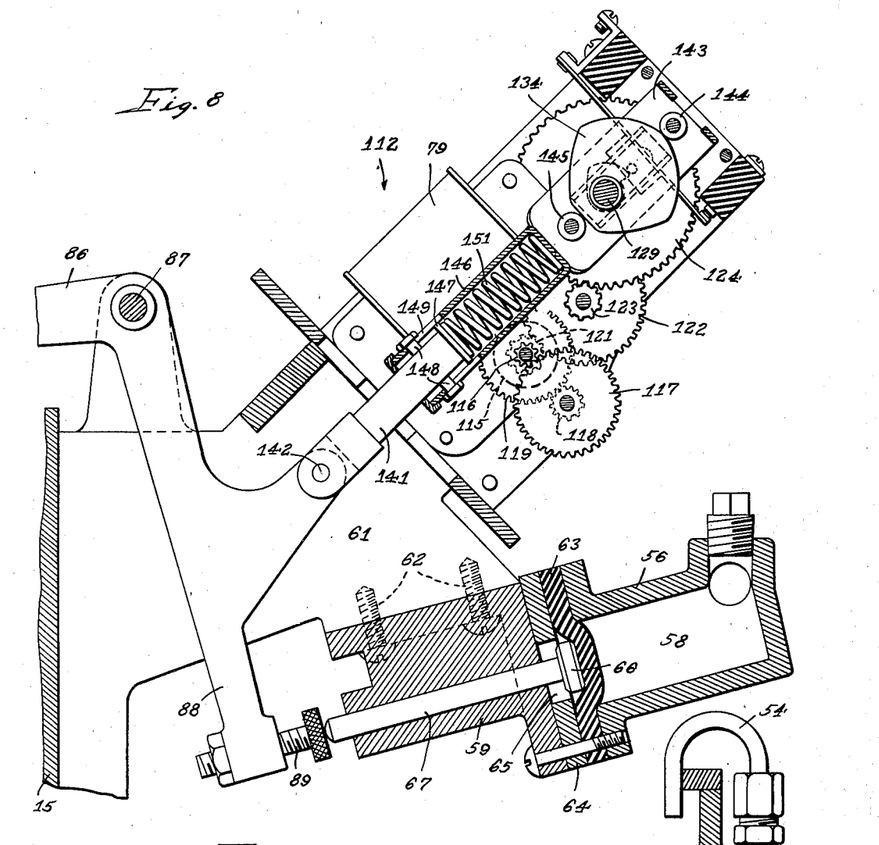
Fig. 8 is a section on the line 8—8 of Fig. 3 showing the driving motor and the soap pump.
Figure 9:
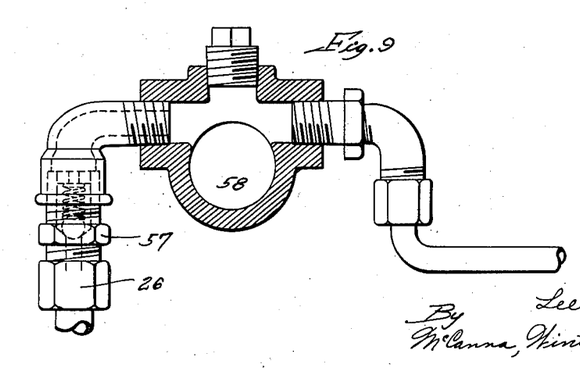
Fig. 9 is a section on the line 9—9 of Fig. 5 showing the pipe connections to the soap pump.

Soap solution enters the chamber by way of a tube 54. The tube 54 has a ball check valve 55 positioned therein adapted to prevent return flow of solution and is connected to a pump cylinder 56 from which soap solution is supplied to the line 54 to be discharged into the chamber 27. Soap solution is drawn into the pump cylinder 56 through the tube 26 which likewise has a ball check valve 57 designed to prevent return flow from the pump cylinder to the reservoir 22. The pump cylinder 56 has a chamber 58 adapted normally to be filled with soap solution. The cylinder is supported on the frame 15 through a bracket 59 which is attached to a bracket 61 by means of screws 62, the bracket 61 in this instance being integral with the frame 15. Interposed between the cylinder 56 and the bracket 59 is a resilient diaphragm 63 of rubber or similar material and a spacer block 64 having a central opening 65 for the reception of a plunger 66 carried on a reciprocable stem 67. When the plunger 66 is moved to the right facing Fig. 8, the diaphragm 63 is moved into the chamber 58 displacing a part of the soap solution outward through the tube 54 and into the test chamber, whereas when the stem 67 is released, the plunger 66 is returned by action of the diaphragm 63 which moves out of the chamber 58 drawing soap solution into the chamber 58 past the check valve 57.

In order to agitate or mix and aerate the contents of the test chamber, an agitator 68 is provided carried on a shaft 69 depending into the chamber and driven by a small electric motor designated generally by the numeral 71, the motor being controlled in its periods of operation by timing and control mechanism which will presently be described. Operation of this motor serves to mix the water and soap solution and to create a froth or foam therein when the water is soft, the test being analogous to the conventional soap test.

In order to actuate mechanism in response to the presence or absence of a predetermined amount of permanent foam or suds on the water, I employ an inverted cup-shaped float designated generally by the numeral 72. I have found that one satisfactory type of float consists of a hemisphere of Celluloid of relatively thin cross-section (see Fig. 5). This is supported at its apex on a lever 73 pivotally supported on the frame 15 by means of ears 74 and needle point bearings 75, the support being intermediate the ends of the lever 73. The opposite end of the lever 73 has a roller 76 positioned thereon adapted to engage a cam designated generally by the numeral 77 carried on a shaft 78 driven by a motor 79 enclosed within a housing 81. The cam 77 has a notch 82 provided at one side with an angularly disposed surface 83 and at the opposite side with an arcuate portion 84, the portion 84 engaging the roller 76 to gradually rotate the lever 73 and lift the float to its upper position defined by the cam surface 85. The angular portion 83 permits of gradual release of the roller 76 and movement of the end of the lever 73 into the notch 82 and a consequent gentle lowering of the float 72. The cam 77 rotates in timed relation with the remainder of the mechanism so that upon the completion of the agitation of the contents of the chamber 27 and a short rest period, the float 72 is lowered. The float and lever 73 are so counterbalanced that if foam persists on the top of the solution in the test chamber, the float will remain in an upper position supported by the foam. Such a condition exists when the water in the test chamber is soft. On the other hand, when the water therein is hard beyond a predetermined degree as determined by the setting of the stationary contacts and the adjustment of the pump, the soap will be insufficient to produce a stable foam and consequently the float 72 will move on downward to the position shown in Fig. 5.

Figure 10:
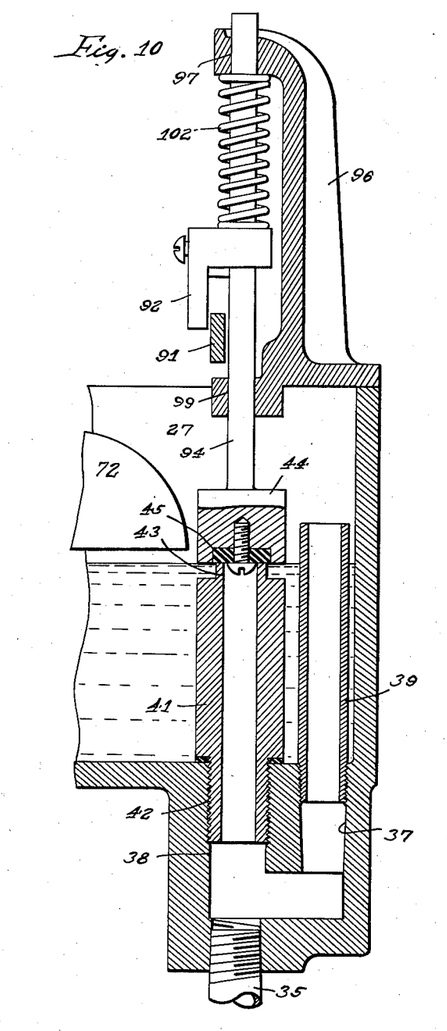
Figs. 10 and 11 are sections on the lines 10—10 and 11—11 of Fig. 5.
Figure 11:
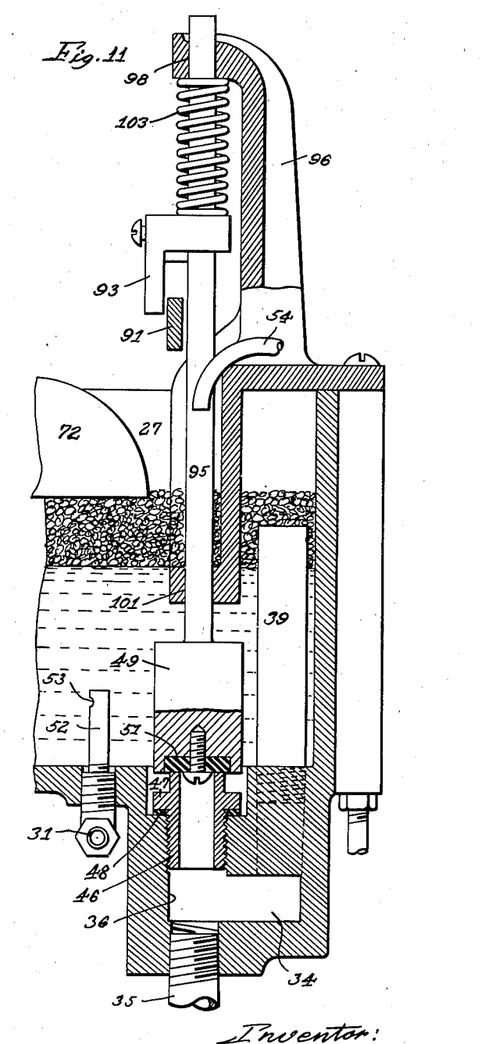

The closures 44 and 49, the inlet valve 32, and the reagent stem 67 are actuated by a lever 86 in the nature of a bell crank lever pivotally supported intermediate its ends on the frame 15 as shown at 87. One of the arms 88 thereof carries an adjustable screw 89 adapted to contact the stem 67 and actuate the same. The opposite leg 91 thereof extends over the test chamber 27 and is adapted to engage adjustable fingers 92 and 93 supported on stems 94 and 95 which carry the closure members 44 and 49, as shown in Figs. 10 and 11. The frame 15 has an upwardly extending arm 96 having openings 97 and 98 for sliding reception of the stems 94 and 95. The stems also have a lower sliding support as shown at 99 and 101. Springs 102 and 103 act between the arm 96 and the fingers 92 and 93 to normally urge the stems to the closed position. The lever arm 91 has an extreme end portion 104 adapted to engage the end of a valve lever 105 which has pivotal connection with the stem 106 of the valve 32 and is fulcrumed at 107 on a link 108 pivotally supported on a pin 109 attached to the frame 15 whereby upon rotation of the arm 91 the valve lever 105 is rotated about its pivotal support 107, the link 108 permitting of lateral adjustment of the lever. A spring 111 acts between the valve lever 105 and the frame 15 normally urging the valve stem 106 to the closed position of the valve.

Driving and control units indicated generally by the numeral 112 and 113, respectively, are provided for controlling the sequence of operation of the device and for driving the various elements thereof. The unit 112 includes the motor 79 and the casing 81 which encloses the gearing, contacts and contact cams. Likewise, the unit 113 has a casing 114 which encloses the motor, gearing and contact cams of this unit. The unit 112 is herein designated as the operating or driving unit, whereas the unit 113 is designated as the timing or control unit. The driving unit 112 includes the motor 79 having a rotor 115 carrying a pinion 116 which drives a gear 117 having a pinion 118 meshing with an idler gear 119, which in turn has a pinion 121 which meshes with an idler 122 also carrying a pinion 123, which in turn drives a gear 124 attached to a cam shaft 129. The cam 77 is fixed on the cam shaft 129 outside the casing of the unit, and the shaft carries cams 131, 132, 133, 134 and 135 within the casing adapted to actuate spring pressed movable contacts 136 to 139, inclusive. The cam 134 functions to actuate a push and pull rod 141 pivotally attached to the lever 86 as shown at 142 for the purpose of actuating the lever 86 which controls the operation of the inlet valve, the drain valve, the overflow valve and the reagent pump as heretofore described. The push rod 141 has a cam follower 143 to which are attached spaced rollers 144 and 145 which bear against opposite sides of the cam 134. The follower has a depending sleeve 146 within which the upper end of the rod 141 is received for sliding movement, the upper end of the rod having a flanged head as shown at 147. The rod carries a transverse pin 148 which is slidably received in slots 149 to allow a certain amount of lost motion between the rod and the sleeve 146. Positioned within the sleeve is a spring 151 acting between the inner end of the sleeve and the flange 147. Through this arrangement it will be seen that when the cam follower moves downward facing Fig. 8 rotating the lever 86 in a clockwise direction, the follower may continue to move down after the lever has reached the end of its movement, the cross pin 148 permitting continued movement of the sleeve 146 and the application of spring pressure to the end of the push rod 141, as a result of continued downward movement of the follower. The movable contacts 136 to 139 cooperate with stationary contacts 152 to 155, inclusive, to open and close circuits for the control of the device, as will presently appear.

The timing unit 113 has a timing motor 156, in this instance of the self-starting synchronous type which drives a cam shaft 157 through suitable gearing 158. The gearing 158 may be changed as desired in order to produce a desired time cycle. Cams 159, 161, 162, 163 and 164 are positioned on the shaft 157 and serve to actuate movable contacts 165 to 169, which contacts are spring pressed against the cams. The movable contacts cooperate with stationary contacts 171 to 175 to function in the control of the device.

Figure 2:
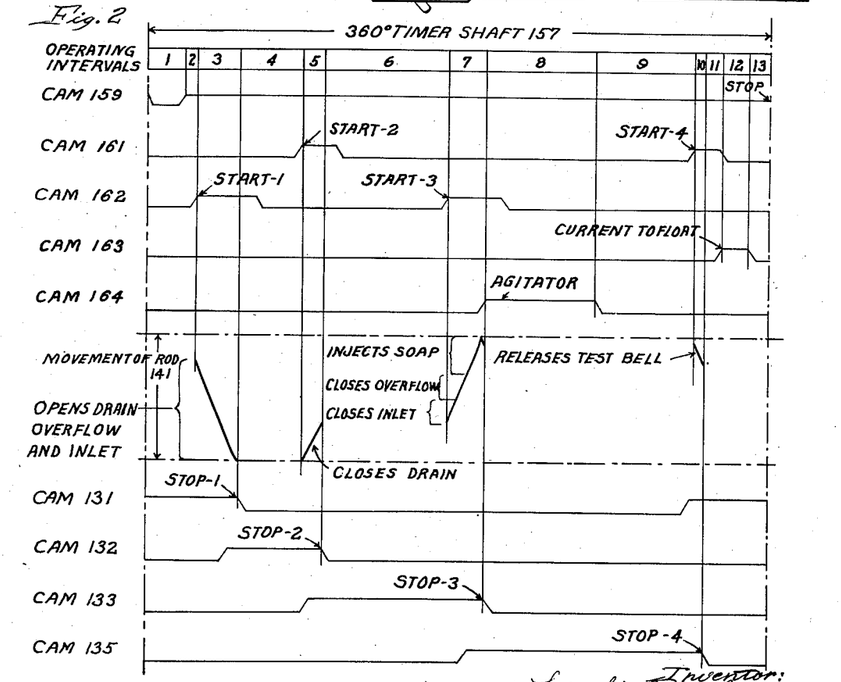
Fig. 2 is a chart showing the sequence of operation of the device.

Attention is now directed more particularly to the diagrammatic showing and wiring diagram of Figure 1, and to the diagram of Fig. 2. The latter diagram shows the relative points at which the various cams open and close their respective contacts and actuate the various instrumentalities and the degree of movement during the driving periods of the motor 79. Power is supplied for operation of the device through a transformer 176 from the secondary of which power is supplied to the timing motor 156 by way of a conductor 177, stationary contacts 178, of a relay designated generally by the numeral 179, bridging contacts 181 of the relay, a conductor 182, a conductor 183, a manually operated master switch 184, a time control switch 185, a conductor 186, a conductor 187, the motor 156, and a conductor 188 back to the secondary of the transformer. The time operated switch 185 is optional, but may in many instances be desirable for the purpose of keeping the tester in operation during certain working hours, and in terminating the operation of the tester during other hours when there is only a small draw of water, as for example, in a laundry. In the absence of the time switch 185 the tester will remain in operation repeating cycle after cycle so long as the master switch 184 is closed. During the initial movement of the timing motor 156, after the closing of switch 184, the cam 159 rotates sufficiently to close the contacts 165 and 171, thus establishing circuit through the motor 156 by way of the conductor 177, the contacts 178 and 181, the conductor 182, a conductor 189, the contacts 171 and 155, a conductor 191, a conductor 192, the conductor 187, the motor 156 and conductor 188. This will maintain the contacts 165 and 171 closed throughout a complete revolution of the shaft 157 whereby the test cycle will always be completed regardless of the opening of switch 184, and the parts will be returned to the test or their initial position.

Shortly after the start of the motor 156, that is, after the start of a cycle characterized by rotation of the cam 159 out of the position shown in Figure 1, a high spot 195 on the cam 162 causes the contacts 167 and 173 to close, thus energizing the driving motor 79 by way of a circuit including the conductor 177, contacts 178 and 181, conductors 182 and 183, switch 184, conductor 186, conductor 192, conductors 194 and 195, the contacts 167 and 173, conductors 196 and 197, contacts 152 and 136, which at this point are closed by the cam 131, a conductor 198, the motor 79, conductor 199 and conductor 188. Thereupon the motor 79 drives the shaft 129 through a part of a revolution somewhat less than 180°, as will appear from Fig. 2, or until the cam 131 permits the opening of contacts 136 and 152. This movement of the shaft 129 causes the cam 132 to close contacts 137 and 153 and the cam 134 to move the push rod 141 downward facing Figure 1, thereby lifting the stems 94 and 95 and moving the closures 44 and 49 to the open position to open the drain and the overflow. This movement of the lever 86 likewise lifts the stem 106 of the inlet valve 32 so as to establish a flow of liquid into the chamber 27. Liquid flows through the chamber 27 for a short period of time for the purpose of flushing out the lower part of the chamber, the liquid passing out through the drain, the liquid continuing to flow until the motor 156 rotates the cam 161 to a point where a projection 201 thereon closes contacts 166 and 172. This completes a circuit through the driving motor 79 by way of the conductor 177, contacts 178 and 181, conductors 182 and 183, switch 184, time contacts 185, conductors 186, 192 and 194, contacts 166 and 172, a conductor 202, a conductor 203, contacts 137 and 153, conductor 198, motor 79 and conductors 199 and 188. The motor 79 thereupon rotates the shaft 129 until the contacts 137 and 153 are opened by action of the cam 132, whereupon the motor 79 stops. During this movement of the shaft 129 the cam 133 is brought into position to close contacts 138 and 154 and simultaneously the cam 134 operates to move the rod 141 and the lever 86 so as to permit closing of the drain valve or closure 49 under the action of the spring 103, keping the inlet valve 32 open and the overflow closure 44 open. Under these circumstances liquid fills the chamber 27 and continues to flow through the chamber causing the upper walls thereof to be flushed, the excess water flowing out through the overflow so as to clean the chamber. This flushing period is terminated by operation of a projection 204 on the cam 162 which operates to close the contacts 167 and 173 thereby again energizing the motor 79 by way of a circuit including conductor 177, contacts 178 and 181, conductors 182 and 183, switches 184 and 185, conductors 186, 192, 194 and 195, contacts 167 and 173, conductor 196, a conductor 205, contacts 138 and 154, conductor 198, motor 79 and conductor 199, causing the motor 79 to drive the shaft 129 until the circuit thereto is broken by operation of the cam 133 opening contacts 138 and 154. During this rotation the cam 134 moves the rod 141 and the lever 86 so as first to close the inlet valve 32. This interrupts the flow of liquid into the chamber 27 and permits the liquid to level and drain through the overflow to a predetermined level, thus retaining a measured sample of the liquid in the chamber. Continued movement of the lever 86 thereupon permits the closure 41 to close the overflow under the action of the spring 102. As the lever 86 continues to rotate, the adjustable screw 89 on the end 88 of the lever 86 comes into contact with the stem 67 of the reagent pump and moves the same toward the right facing Fig. 8, thereby displacing a measured quantity of the reagent into the chamber 27 by way of the tube 54. The cam 134 and follower 146 are so arranged and positioned that the direction of rotation of the lever 86 is then changed causing the adjustable screw 89 to move back and permitting the stem 67 and plunger 66 to move to the left facing Fig. 8 a slight distance so as to withdraw the pressure on the reagent in the cylinder 58 to prevent drip from the end of the tube 54. At this point the motor 79 stops under the action of cam 33 as previously described.

At about the time at which the motor 79 stops, the cam 164 causes contacts 169 and 175 to be closed, thereby energizing agitating motor 71 by way of conductor 188, a conductor 206, motor 71, a conductor 207, contacts 169 and 175 and a conductor 208. The agitator motor runs at sufficient speed and for a sufficient length of time to thoroughly mix the soap solution or other reagent into the liquid in the chamber 27 and to beat up a copious foam or suds on the top of the liquid in the chamber 27. In this particular instance 35 seconds has been found to be sufficient. The operation of the motor 71 is terminated by movement of the cam 164 allowing contacts 169 and 175 to open. The parts driven by the motor 79 then remain at rest to allow time for a temporary foam or suds in the chamber 27 to subside, the object being in this instance to use only what is known as the permanent suds for test purposes. While the usual soap test for hardness in water provides that the suds shall persist for five minutes, it has been found satisfactory for present purposes to make this time delay considerably shorter, in this instance about one-half minute. This is possible because it has been found that where there is any appreciable excess of hardness the major portion of the suds will break within a half minute.

Figure 14:
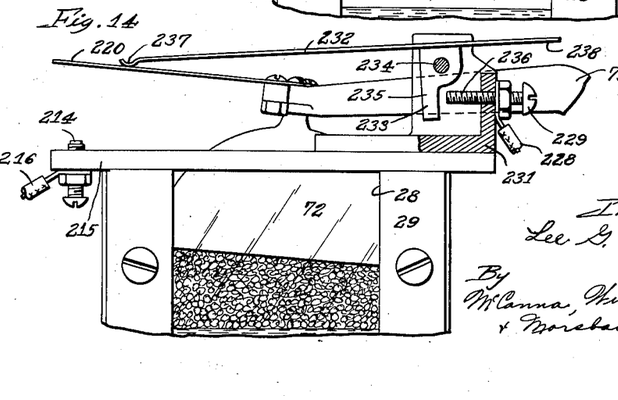

At the close of this interval as determined by the action of a projection 209 on cam 161 closing contacts 166 and 172, the motor 79 is energized by way of a circuit including conductor 177, contacts 178 and 181, conductors 182 and 183, switches 184 and 185, conductors 186, 192 and 194, contacts 166 and 172, conductor 202, a conductor 211, contacts 139 and 155 (closed by means of cam 135 during the previous operation of the motor 79), conductor 198, motor 79 and conductor 199. The motor 79 then operates to drive the shaft 129 through a small angularity or until contacts 139 and 155 are opened by action of cam 135. During this rotation the roller 76 of lever 73 moves in along cam face 83 causing the inverted cup-shaped float 72 to be gently lowered and released. If any substantial degree of froth or suds persists on the top of the liquid in chamber 27, the float will remain on top of this suds as shown in Fig. 14, whereas in the absence of a froth the float will move down to the position shown in Fig. 13.

The lever 73, which is preferably of electrically conductive material, has a screw 212 forming a binding post for the connection of an electrical conductor 213 connected to contact 174. A contact 214 is carried on a piece of insulation 215 attached to the top of the chamber 27 and is connected by means of a conductor 216 to one pole 217 of a double pole switch designated generally by the numeral 218. Another pole of the switch 218 is connected to the relay 179 by way of a conductor 219, the opposite side of the relay being connected to the conductor 188 by means of a lead 221. The lever 73 carries a spring-like or somewhat resilient strip of conductive material 220 positioned to engage contact 214 when the float moves down in the chamber into the position shown in Fig. 13 to establish electrical connection between the contact 214 and the lever 73. It will therefore be seen that when the float 72 is lowered by action of the cam 77, if no suds is present or a predetermined minimum amount is present, as determined by the adjustment of the position of the contact 214, circuit will be established through the relay 179 when the cam 163 closes contacts 168 and 174, this circuit being by way of the conductor 208, contacts 168 and 174, conductor 213, the lever 73, contact 214, conductor 216, switch 218, conductor 219, relay 179, conductor 221 and conductor 188. Thereupon the bridging contacts 181 are broken from contacts 178 and serve to close relay contacts 222 completing a circuit through a lamp 223 by way of conductor 177, contacts 181 and 222, conductor 224 and conductor 188. This energizes the signal lamp 223 and at the same time breaks the circuit through the timing motor 156 locking up the system. This is the condition which will obtain when the device is used in the testing of water for hardness and when a predetermined hardness appears in the water. It will be seen that during the normal course of the tests when used with a zeolite softener the water entering chamber 27 will be soft and the soap solution added thereto will cause a permanent froth so that the float 72 will be held up and the circuit will not be closed through the contact 214, and this contact will only be closed when a permanent suds ceases to be produced as a result of a test cycle.

I have provided means for repeating a test cycle after the relay 179 has locked up, as described, for the purpose of checking the test if desired. This includes a push button 225 inserted in the circuit of the motor 156 by way of a circuit including the conductor 177, contacts 181 and 222, conductor 224, a conductor 226, push button 225, a conductor 227, conductors 186 and 187, motor 156 and conductor 188. The push button 225 is manually held closed until the motor has rotated a sufficient distance to open contacts 168 and 174 whereupon the relay 179 is released breaking the connection between contacts 181 and 222 and making connection between contacts 181 and 178 thereby restoring the motor circuit previously described, whereupon the device will pass through a cycle in the manner heretofore traced.

Figures 12, 13:
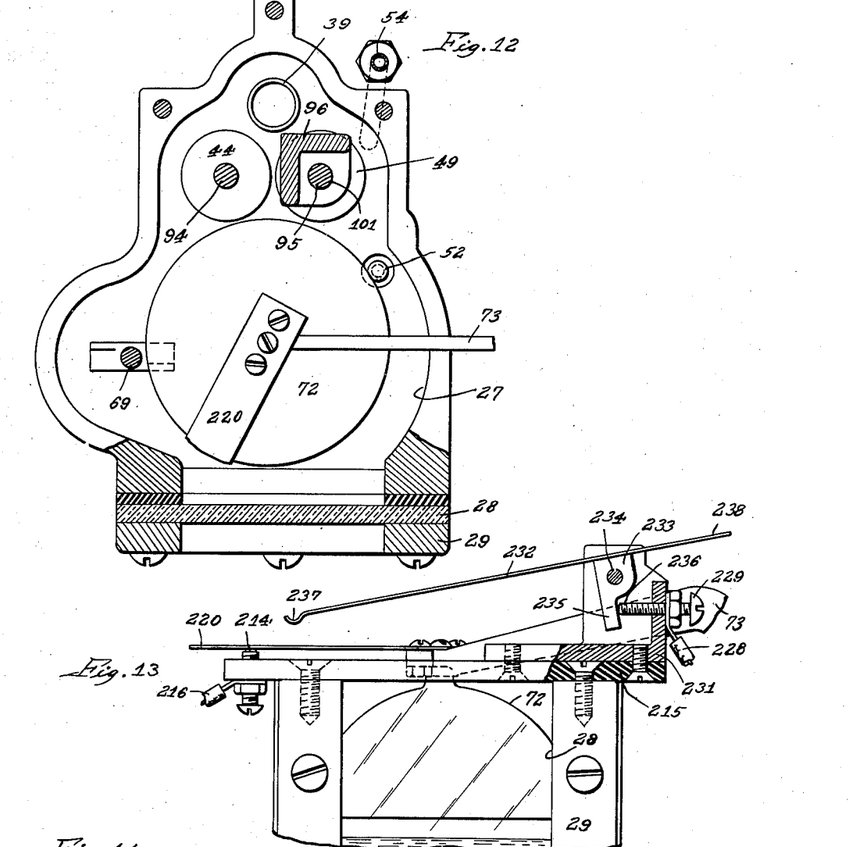
Fig. 12 is a view on the line 12—12 of Fig. 5 showing the top of the test chamber.
Figs. 13 and 14 are fragmentary side views of the test chamber and associated switch mechanism showing moved positions thereof.

The device is also adaptable for use in the testing of the liquid for the opposite property, or, in other words, for the absence of the property under consideration. In the present example I have described the test operations in which the device is set to operate the relay 179 and associated switch contacts upon the appearance of hardness in the water of the sample in chamber 27, the water entering the chamber being normally soft and the relay being actuated upon the appearance of hardness. The device may also be set so that no actuation of the relay occurs when the water entering the chamber is hard but in which the actuation of the relay occurs when the character of the water changes from hard to soft. This apparatus includes the switch 218 which may be manually thrown to a second position establishing circuit between conductor 219 and a conductor 228 which is electrically connected to a binding post 229 supported on a bracket 231 attached to the insulation 215 (Fig. 13). A contact strip 232, in this instance consisting of a strip of copper or other electrically conductive material and preferably of light weight, is pivotally supported on the bracket 231 by means of a supporting member 233 carried on a pin 234 and having a depending arm 235 adapted to be engaged by the end 236 of the binding post 229. The outer end of the strip 232 may be curved as shown at 237 and is positioned in the path of travel of the strip 220 so as to make contact therewith in an elevated position of the strip 220. The opposite end of the strip 232 may conveniently extend beyond the supporting member 233 as shown at 238 for the purpose of counterbalancing the strip. It will be seen that the support for the strip 232 is such that the inverted cup-shaped float 72 and the lever 73 may be moved upward and will rotate the strip 232 when moved beyond the point of contact between the elements. From this description it will be seen that toward the conclusion of a test cycle and after the contents of the chamber have been agitated and the time allowed for the suds to subside, if temporary, when the float 72 is lowered by action of the cam 77, if the water is hard and the suds has completely subsided, the float 72 will pass downward to the position shown in Fig. 13 and contact will be made between the strip 220 and the contact 214. However, the contact 214 is dead and no action will result on the relay 179. However, if the water in the chamber is soft a permanent suds results and the float will stop in the position represented in Fig. 14 wherein electrical connection is established between the strip 220 and the strip 232. Under this condition when the cam 163 closes the contacts 168 and 174, the relay 179 will be energized breaking connection between relay contacts 181 and 178 and making connection between relay contacts 181 and 222, thus energizing the lamp 223 by the previously described circuit, which, under these circumstances indicates that the water under test has changed from hard to soft. This type of test is advantageous during the regeneration of conventional zeolite water softeners during the washing step thereof, that is, while the brine is being washed from the bed preparatory to returning the softener to service.

Attention is directed to the fact that the degree of hardness at which the relay 179 will be energized can be set by adjusting the position of the contact point 214 and the position of the contact strip 232. Thus by moving the contact 214 upward toward the strip 220 the relay will be actuated at a lesser degree of hardness, and likewise by screwing the binding post 229 outward so as to allow the end 237 of the strip 231 to move further downward the relay during the test for the absence of hardness will be actuated at a greater degree of hardness.

In using the device in testing water, as for example, the effluent from a zeolite water softener, the switch 218 is set in a position to establish contact between the conductors 219 and 216 and the inlet valve 32 is connected to the softener at a point such that effluent water from the softener will pass thereto. The manually operated switch 134 is then closed. Under these circumstances the motor 156 will begin to run unless the time contact 185 is employed in this circuit, in which instance the starting of the motor 156 will be dependent upon the setting of this time contact. The tester will then repeat test after test until the water entering the chamber 27 proves to be hard beyond that for which the contact 214 and the screw 79 of the reagent pump are adjusted, whereupon the relay 179 locks up and the lamp 223 is energized indicating that the softener is in need of regeneration. The operator thereupon conducts the regeneration of the softener manually or where an automatic water softener is employed, the conductors leading to the lamp 223 may be employed to control the motor circuit of the automatic softener so as to start the regeneration thereof in response to operation of the relay 179. When the regeneration has proceeded to the point at which the brine is being washed from the zeolite bed and preferably when the washing has been carried forward for some time, the switch 218 is moved to establish contact between conductors 219 and 228, at which point the relay 179 is released by the breaking of the circuit between conductors 219 and 216. Thereupon the tester will proceed through its test cycles until the test shows a lack of hardness producing constituents in the water in the chamber 27, whereupon the relay will again lock up energizing lamp 223. At this point the softener is manually returned to service and the switch 218 is returned to its previous position making contact between conductors 219 and 216, the relay 179 being released as a result of this shift of the switch 218. The tester thereupon resumes its test cycle testing the effluent from the softener for hardness.

Attention is directed to the fact that when the relay 179 is actuated the timing motor 156 stops immediately because of the opening of the circuit at the contacts 178. This position is slightly before the cam 179 permits opening of contacts 165 and 171. On the other hand, if the manual switch 184 or the time operated contacts 185 are opened during the progress of a test, the parts will continue through to the end of the cycle, the motor 156 being in this instance stopped by action of the cam 159 in opening contacts 165 and 171.

While I have thus described and illustrated a specific embodiment of my invention by way of example, I do not wish to be limited except as required by the prior art and the scope of the appended claims, in which—

I claim:

1. The combination in an automatic hardness tester for water of a test chamber, a driving motor, means driven by the motor for introducing a measured sample of water into said chamber, a closed reagent system including a pump driven by said motor for adding a predetermined amount of soap solution of definite concentration into said sample, means for agitating said sample and soap solution to produce the absence of foam or the presence thereof above the surface of the water depending upon the hardness of the water, a float adapted to seat on the surface of said sample comprising a chambered member defining an air volume for displacing said sample and froth to support the weight of the float, means driven by said motor for seating said float against the surface of said sample, and means for emitting a signal in response to the seated position of the float to indicate the presence or absence of foam.

2. The combination in an automatic hardness tester for water of a test chamber, a driving motor, means driven by the motor for introducing a measured sample of water into said chamber, a closed reagent system including a pump driven by said motor for adding a predetermined amount of soap solution of definite concentration into said sample, means for agitating said sample and soap solution to produce the absence of foam or the presence thereof above the surface of the water depending upon the hardness of the water, a float adapted to seat on the surface of said sample comprising a chambered member defining an air volume for displacing said sample and froth to support the weight of the float, means driven by said motor for seating said float against the surface of said sample, an electrically energized signal, contacts positioned to be selectively closed by said float seating means when the float seats in an elevated position on the foam and in a lowered position on the surface of the water, and manually operable means for placing said signal under the control of either of said contacts to render the signal responsive solely to either the presence or the absence of hardness.

3. The combination in an automatic hardness tester for water of a test chamber, a driving motor, means driven by the motor for introducing a measured sample of water into said chamber, a closed reagent system including a pump driven by said motor for adding a predetermined amount of soap solution of definite concentration into said sample, means for agitating said sample and soap solution to produce the absence of foam or the presence thereof above the surface of the water depending upon the hardness of the water, a float adapted to seat on the surface of said sample comprising a chambered member defining an air volume for displacing said sample and froth to support the weight of the float, means driven by said motor for seating said float against the surface of said sample, signal means including a contact positioned to be closed by said float seating means in response to the seated position thereof to indicate the presence or absence of foam, and means for energizing said contact after the closing thereof and after the float reaches its seated position.

4. The combination in an automatic hardness tester for water of a control motor, an operating motor and an agitating motor, electrical contacts operated by the control motor for starting said operating motor and for starting and stopping said agitating motor, a test chamber having inlet, drain and overflow valves and a closed reagent system including a closed container and a reagent pump, a lever driven by said operating motor arranged to open and close the drain, overflow and inlet valves and to operate the reagent pump, an inverted cup-shaped float adapted to be lowered into said chamber for test purposes shaped to trap air therein when seated upon the sample and the froth, means driven by the operating motor for lowering said float to make a test and for lifting said float upon the completion of a test, said means having a contact thereon, manually adjustable stationary electrical contacts positioned to be engaged by said float contact in either of two operative positions thereof, and a relay arranged to be energized in response to the making of said contact.

5. The combination in an automatic hardness tester for water of a test chamber, a driving motor, means driven by the motor for introducing a measured sample of water into said chamber, a closed reagent system including a pump driven by said motor for adding a predetermined amount of soap solution of definite concentration into said sample, means for agitating said sample and soap solution to produce the absence of foam or the presence thereof above the surface of the water depending upon the hardness of the water, a float adapted to seat on the surface of said sample comprising a chambered member defining an air volume for displacing said sample and froth to support the weight of the float, means driven by said motor for seating said float against the surface of said sample, a power circuit for said motor, a controlled circuit, a relay arranged in its deenergized position to close said power circuit and open said controlled circuit, and in the energized position thereof to open said power circuit and close said controlled circuit, a contact positioned to be closed by said float seating means in response to change in the seated position of said float corresponding to a predetermined change in the hardness of the water to energize said relay to stop the cycle of tests and permanently energize said controlled circuit.

6. The combination in a hardness tester for water of a test chamber, means for washing out the test chamber and for taking a sample of water therein, means comprising a closed reagent system for adding an accurately measured quantity of soap solution of uniform concentration to said sample, means for agitating said sample to produce the presence or absence of a froth on said sample depending upon the hardness thereof, an inverted cup-shaped float shaped to trap air therein when seated upon the sample and the froth adapted to seat either on the surface of said sample or on the froth of said sample, means for lifting and lowering said float into said chamber, said means including an electrical contact arm, an electrical relay and spaced contacts positioned for engagement by said contact arm to control said relay, an electric motor for initiating the operation of each of said means in timed relation, means under the control of said relay for stopping said motor and energizing an independent circuit in response to energization of the relay, and manually operable means for restarting said control motor.

7. The combination in a water tester of a test chamber, means for taking samples of water therein for test purposes, an enclosed reagent supply system including an enclosed diaphragm pump having its inlet constantly submerged in a supply of soap solution for adding a soap solution of different uniform strength to said sample, means for agitating the sample to produce the presence or absence of a froth thereon in predetermined amount depending upon the hardness of the sample, an inverted cup-shaped float having depending edges for entrapping air therein against the surface of the sample, means for lifting and lowering said float to the surface of said sample to produce an indication in response to the position of the float, and means for adjusting the stroke of said pump to vary the range of the tester.

8. The combination in a water tester for conducting successive tests on water supplied thereto of a test chamber having an inlet valve, a drain valve, an overflow valve, and an enclosed reagent system including injection means, a single lever positioned for reciprocation in one direction to open the inlet, drain and overflow valves, and upon reciprocation in the opposite direction to close said valves and operate said injection means, an inverted cup-shaped float for determining the results of a test in said chamber, a motor, and cam means driven thereby, arranged to periodically reciprocate said lever and to simultaneously raise and lower said float with respect to the chamber to conduct a test.

LEE G. DANIELS.